US012444249B2

(12) United States Patent
Inoue

(10) Patent No.: US 12,444,249 B2
(45) Date of Patent: Oct. 14, 2025

(54) MARINE PROPULSION DEVICE INFORMATION TRANSMITTING AND RECEIVING SYSTEM AND MARINE PROPULSION DEVICE INFORMATION TRANSMITTING AND RECEIVING METHOD

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 300 days.

(21) Appl. No.: 18/122,150

(22) Filed: Mar. 16, 2023

(65) Prior Publication Data

US 2023/0306799 A1    Sep. 28, 2023

(30) Foreign Application Priority Data

Mar. 23, 2022  (JP) ................... 2022-047151

(51) Int. Cl.
*B63B 79/30* (2020.01)
*B63B 79/10* (2020.01)
(Continued)

(52) U.S. Cl.
CPC ............ *G07C 5/0808* (2013.01); *B63B 79/10* (2020.01); *B63B 79/30* (2020.01); *B63B 79/40* (2020.01);
(Continued)

(58) Field of Classification Search
CPC .... G07C 5/0808; G07C 5/008; G07C 5/0841; B63B 79/10; B63B 79/30; B63B 79/40;
(Continued)

(56) References Cited

U.S. PATENT DOCUMENTS

2006/0184295 A1    8/2006  Hawkins et al.
2007/0200756 A1    8/2007  Saito
(Continued)

FOREIGN PATENT DOCUMENTS

DE    10 2016 114 399 A1    2/2017
DE    10 2020 200 471 A1    7/2021
(Continued)

OTHER PUBLICATIONS

Machine translation for DE 102020200471, Ebeling et al. (WIPO Translate) (Year: 2021).*
(Continued)

*Primary Examiner* — Dino Kujundzic
(74) *Attorney, Agent, or Firm* — Keating & Bennett, LLP

(57) ABSTRACT

A marine propulsion device information transmitting and receiving system includes a watercraft and a server. The watercraft includes an engine and a controller to control the engine. The controller encrypts an operating time of the engine and data related to the engine with an encryption key associated with information unique to the engine. The watercraft includes a communicator to transmit the information unique to the engine, the encrypted operating time of the engine, and the encrypted data related to the engine to the server. The server decrypts the encrypted operating time of the engine and the encrypted data related to the engine with the encryption key associated with the information unique to (Continued)

the engine, and determines whether or not the decrypted data related to the engine are genuine based on the decrypted operating time of the engine.

13 Claims, 7 Drawing Sheets

(51) Int. Cl.
    *B63B 79/40*     (2020.01)
    *B63H 21/21*     (2006.01)
    *F02D 29/02*     (2006.01)
    *G06F 21/60*     (2013.01)
    *G07C 5/00*     (2006.01)
    *G07C 5/08*     (2006.01)

(52) U.S. Cl.
    CPC ............. *B63H 21/21* (2013.01); *F02D 29/02* (2013.01); *G06F 21/602* (2013.01); *G07C 5/008* (2013.01); *F02D 2200/0614* (2013.01)

(58) Field of Classification Search
    CPC . B63H 21/21; F02D 29/02; F02D 2200/0614; G06F 21/602
    See application file for complete search history.

(56) References Cited

U.S. PATENT DOCUMENTS

| | | | | |
|---|---|---|---|---|
| 2009/0118899 | A1* | 5/2009 | Carlson | G01C 22/02 |
| | | | | 701/33.4 |
| 2012/0262283 | A1* | 10/2012 | Biondo | G07C 5/085 |
| | | | | 340/425.5 |
| 2017/0039848 | A1 | 2/2017 | Hakeem | |
| 2017/0259942 | A1* | 9/2017 | Ziarno | F02C 9/00 |
| 2018/0292215 | A1* | 10/2018 | Akuzawa | G05D 1/0011 |

FOREIGN PATENT DOCUMENTS

| | | |
|---|---|---|
| JP | 2011-113538 A | 6/2011 |
| WO | 2005/098468 A1 | 10/2005 |
| WO | 2010/005392 A1 | 1/2010 |

OTHER PUBLICATIONS

Official Communication issued in corresponding European Patent Application No. 23159070.4, mailed on Sep. 19, 2023.

* cited by examiner

MARINE PROPULSION DEVICE INFORMATION TRANSMITTING AND RECEIVING SYSTEM AND MARINE PROPULSION DEVICE INFORMATION TRANSMITTING AND RECEIVING METHOD

CROSS REFERENCE TO RELATED APPLICATIONS

This application claims the benefit of priority to Japanese Patent Application No. 2022-047151 filed on Mar. 23, 2022. The entire contents of this application are hereby incorporated herein by reference.

BACKGROUND OF THE INVENTION

1. Field of the Invention

The present invention relates to a marine propulsion device information transmitting and receiving system and a marine propulsion device information transmitting and receiving method.

2. Description of the Related Art

In a boat rental business, for instance, the following are executed at the time of returning a rental watercraft: charging of fuel fee, and checking for trouble or a malfunction and the like, caused by a user operation.

The fuel fee is charged based on the amount of fuel required for filling up the watercraft after rental. However, a fill-up position varies with the tilt of the watercraft. Thus, the fuel fee has a large margin of error. Besides, it is difficult to check whether or not the watercraft had been filled up at the start of rental. Regarding the trouble or malfunction and so forth, for instance, even when an undesired load has acted on an engine due to an unrecommended operation performed by the user during navigation, it is difficult to confirm an occurrence of such troubles or problems unless the troubles or problems are uncovered in a recognizable manner.

On the other hand, there is a type of watercraft including a communication device for performing wireless communication with a server. For example, Japan Laid-open Patent Application Publication No. 2011-113538 describes a watercraft including a communication device communicable with a server over the Internet. A controller in the watercraft transmits information related to the watercraft obtained during navigation to the server through the communication device.

Because of this, it can be assumed to transmit data related to an engine, including the flow rate of fuel, operations, and so forth, to the server through the communication device during navigation. However, there is a concern that the data are falsified and are then transmitted to the server.

The following content has been disclosed as a technology for inhibiting data falsification: a terminal transmits, to a server, information encrypted with an identification code assigned to the terminal; then, the server decrypts the information with the identification code assigned to the terminal as a sender (see e.g., PCT International Publication No. WO 2005/098468).

However, even if the technology described in PCT International Publication No. WO 2005/098468 is used for transmitting information related to a watercraft to a server, it is impossible to detect a falsification of the information when the information per se has been falsified at the time of informational input into the terminal from an information source. Besides, even when encryption of the information has not been decrypted yet, false information can be transmitted to the server by recording data communication in advance and thereafter transmitting the recorded data to the server.

SUMMARY OF THE INVENTION

Preferred embodiments of the present invention provide marine propulsion device information transmitting and receiving systems and marine propulsion device information transmitting and receiving methods that each prevents data related to an engine of a watercraft from being falsified.

A marine propulsion device information transmitting and receiving system according to a preferred embodiment of the present invention includes a server and a watercraft. The watercraft includes a propulsion device and a communicator to communicate with the server. The propulsion device includes an engine and a controller configured or programmed to control the engine and is connected to the communicator. The controller encrypts an operating time of the engine and data related to the engine with an encryption key associated with information unique to the engine. The communicator transmits the information unique to the engine, the encrypted operating time of the engine, and the encrypted data related to the engine to the server. The server receives the information unique to the engine, the encrypted operating time of the engine, and the encrypted data related to the engine, decrypts the encrypted operating time of the engine and the encrypted data related to the engine with the encryption key associated with the information unique to the engine, and determines whether or not the decrypted data related to the engine are genuine based on the decrypted operating time of the engine.

A marine propulsion device information transmitting and receiving method according to another preferred embodiment of the present invention includes transmitting and receiving data related to an engine of a propulsion device installed in a watercraft. The marine propulsion device information transmitting and receiving method includes encrypting the data related to the engine of the propulsion device and an operating time of the engine with an encryption key associated with information unique to the engine, transmitting the information unique to the engine, the encrypted data related to the engine, and the encrypted operating time of the engine through a communicator, receiving the information unique to the engine, the encrypted data related to the engine, and the encrypted operating time of the engine by a server, and decrypting the encrypted data related to the engine and the encrypted operating time of the engine with the encryption key associated with the information unique to the engine, and determining whether or not the decrypted data related to the engine are genuine based on the decrypted operating time of the engine.

A marine propulsion device information transmitting and receiving system according to yet another preferred embodiment of the present invention includes a server and a watercraft. The watercraft includes a propulsion device and a communicator to communicate with the server. The propulsion device includes an engine and a controller that controls the engine and is connected to the communicator. The controller encrypts data related to the engine with an encryption key. The communicator is configured or programmed to transmit the encrypted data related to the engine to the server. The server decrypts the encrypted data related to the engine with the encryption key.

The data related to the engine are encrypted with the encryption key and are then transmitted to the server to prevent false data from being inputted into the communicator and then transmitted to the server. The operating time of the engine is transmitted together with the data related to the engine. Thus, it is possible to determine whether or not the data related to the engine are genuine based on the operating time of the engine. Because of this, even when the engine is operated in an arbitrary operating state, data outputted from the engine at this point in time are stored for a predetermined period of time, are then transmitted to the communicator, and are further transmitted therefrom as false data to the server, it is possible to determine that the data received by the server correspond to the stored data with reference to the operating time of the engine. With this configuration, it is possible to prevent the data related to the engine from being falsified.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter explained with reference to drawings.

Figure 1:
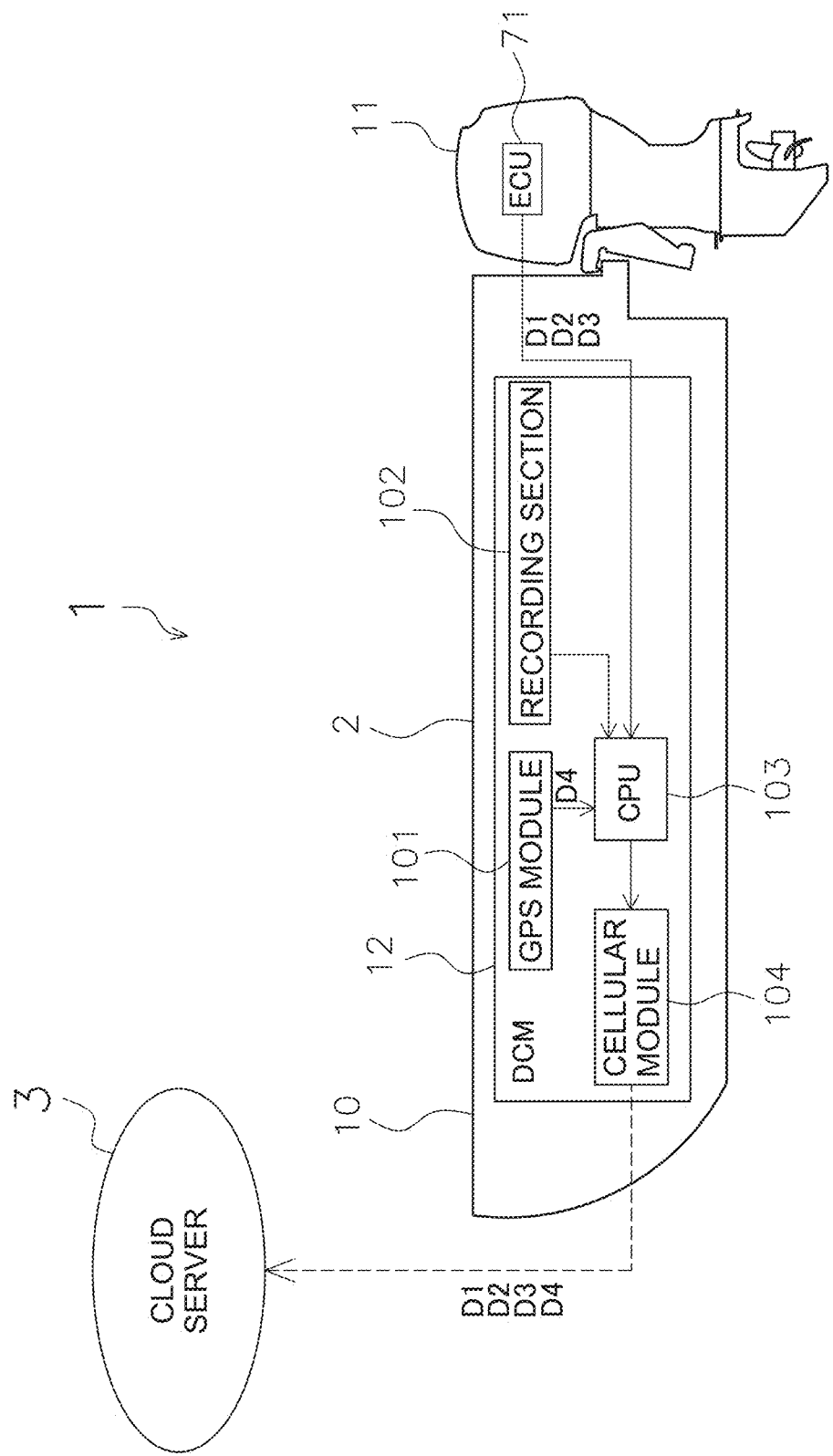
FIG. 1 is a schematic diagram of a marine propulsion device information transmitting and receiving system according to a preferred embodiment of the present invention.

FIG. 1 is a diagram showing a marine propulsion device information transmitting and receiving system 1 according to a preferred embodiment of the present invention. The marine propulsion device information transmitting and receiving system 1 includes a watercraft 2 and a cloud server 3 (exemplary server). The watercraft 2 transmits data (information) related to an engine of a marine propulsion device 11 (exemplary propulsion device) to the cloud server 3. Then, the cloud server 3 receives the data related to the engine and determines whether or not the received data is genuine. The watercraft 2 includes a vessel body 10, the marine propulsion device 11, and a DCM (Data Communication Module) 12. The data related to the engine of the marine propulsion device 11 are outputted to the DCM 12. The DCM 12 performs wireless communication with the cloud server 3.

Figure 2:
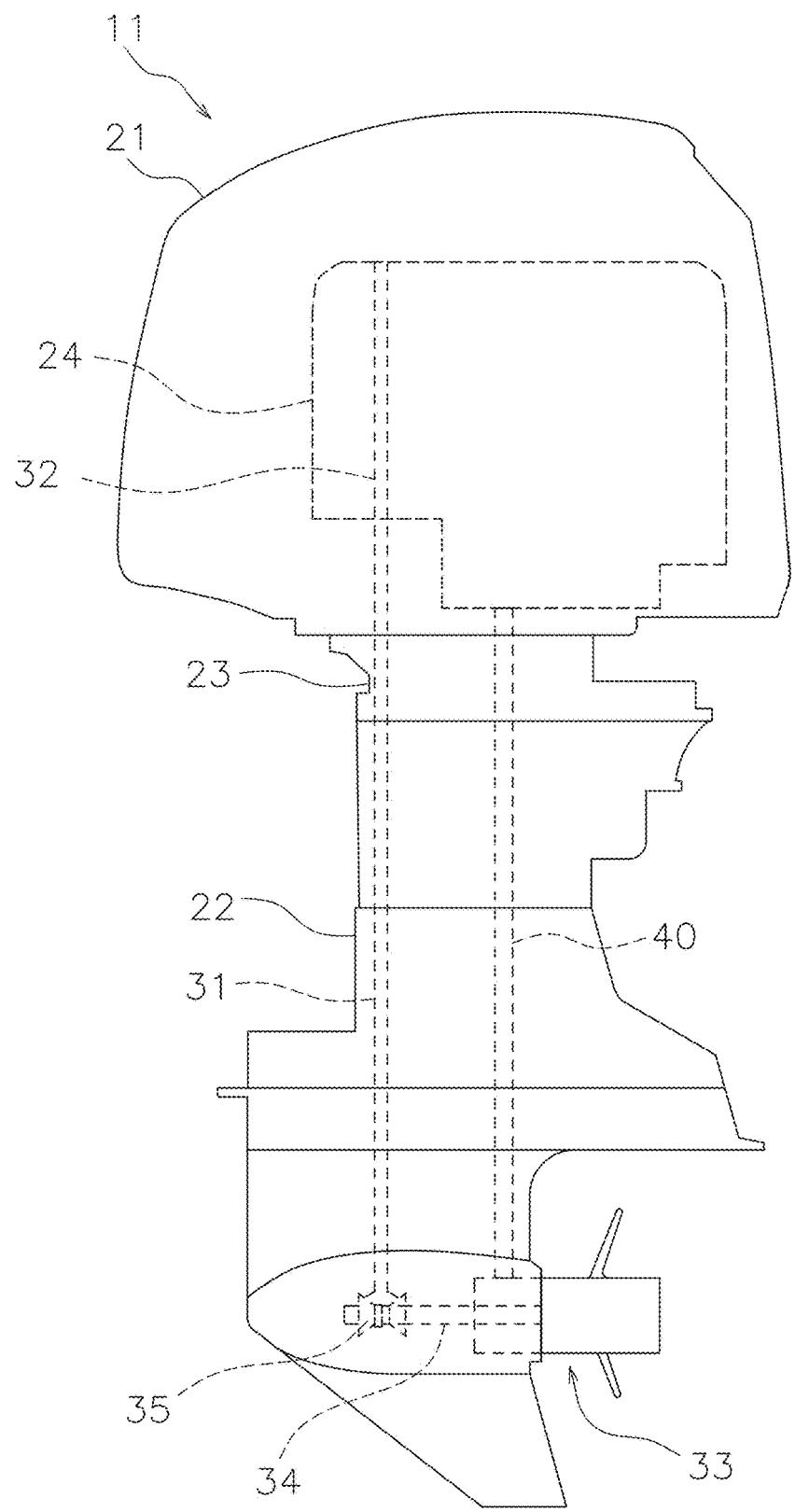
FIG. 2 is a side view of a marine propulsion device.

The marine propulsion device 11 is attached to the stern of the vessel body 10. The marine propulsion device 11 generates a thrust to propel the watercraft 2. In the present preferred embodiment, the marine propulsion device 11 is an outboard motor. FIG. 2 is a side view of the marine propulsion device 11.

The marine propulsion device 11 includes an upper casing 21, a lower casing 22, an exhaust guide section 23, and an engine 24. The upper casing 21, the lower casing 22, and the engine 24 are fixed to the exhaust guide section 23.

The engine 24 is disposed inside the upper casing 21. The engine 24 includes a crankshaft 32. A drive shaft 31 is disposed inside the lower casing 22. The drive shaft 31 is disposed along an up-and-down direction inside the lower casing 22. The drive shaft 31 is coupled to the crankshaft 32 of the engine 24. A propeller 33 is disposed at a lower portion of the lower casing 22. The propeller 33 is disposed below the engine 24. A propeller shaft 34 is coupled to the propeller 33. The propeller shaft 34 is disposed along a back-and-forth direction. The propeller shaft 34 is coupled to a lower portion of the drive shaft 31 through a forward/rearward moving switch section 35.

Figure 3A:
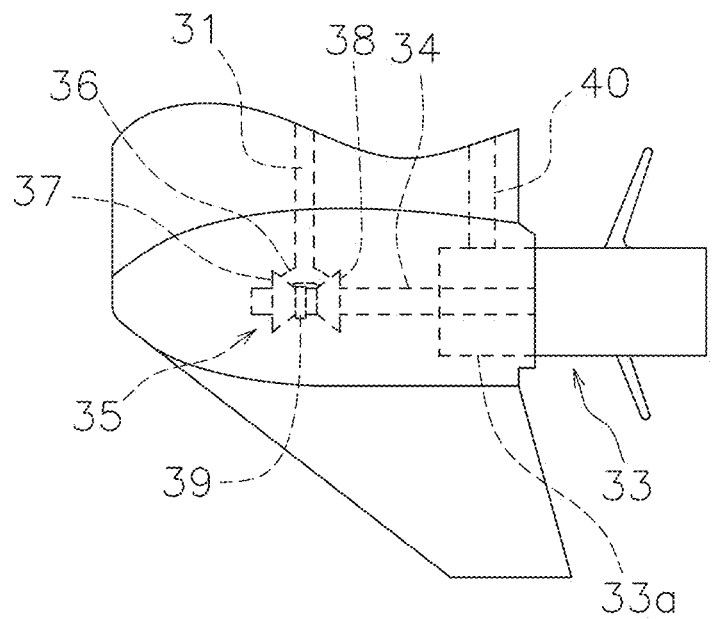
FIGS. 3A and 3B are side views of a configuration of a forward/rearward moving switch section in the marine propulsion device.
Figure 3B:
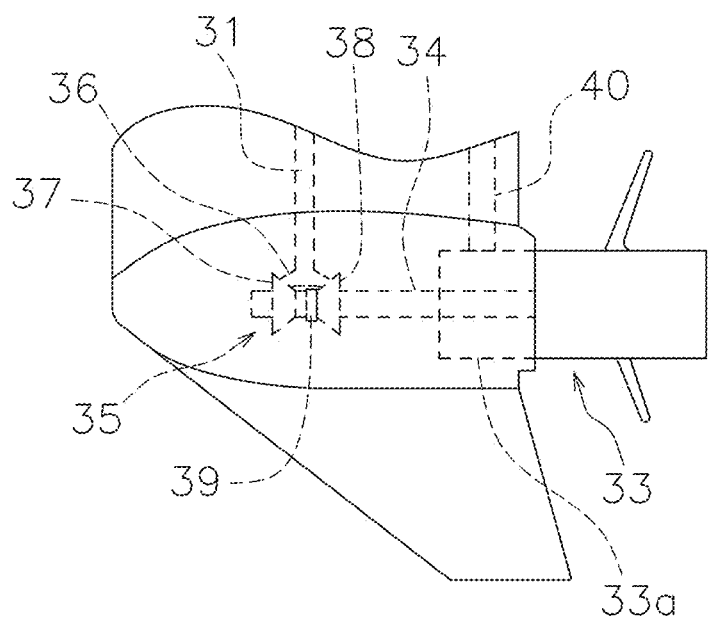

Diagrams in FIGS. 3A and 3B are closeup views of the forward/rearward moving switch section 35 shown in FIG. 2 and the vicinity thereof. The forward/rearward moving switch section 35 includes a pinion gear 36, a forward moving gear 37, a rearward moving gear 38, and a dog clutch 39. The pinion gear 36 is coupled to the drive shaft 31. The pinion gear 36 is meshed with the forward moving gear 37 and the rearward moving gear 38. The forward moving gear 37 and the rearward moving gear 38 are rotatable relative to the propeller shaft 34. The dog clutch 39 is attached to the propeller shaft 34 while being non-rotatable relative thereto. The dog clutch 39 is movable to a forward moving position, a rearward moving position, and a neutral position along the axial direction of the propeller shaft 34. The dog clutch 39 is moved to the forward moving position, the rearward moving position, and the neutral position by a shift actuator 77 (to be described). When the dog clutch 39 is located in the forward moving position shown in the diagram of FIG. 3A, the forward moving gear 37 and the propeller shaft 34 are fixed by the dog clutch 39 while being non-rotatable relative to each other. In this case, rotation of the drive shaft 31 is transmitted to the propeller shaft 34 through the forward moving gear 37. In other words, the forward/rearward moving switch section 35 is set to a forward moving state in which rotation of the drive shaft 31 is transmitted to the propeller 33 so as to rotate the propeller 33 in a direction corresponding to forward movement. Accordingly, the propeller 33 is rotated in the direction corresponding to the forward movement of the vessel body 10. On the other hand, when the dog clutch 39 is located in the rearward moving position shown in the diagram of FIG. 3B, the rearward moving gear 38 and the propeller shaft 34 are fixed by the dog clutch 39 while being non-rotatable relative to each other. In this case, rotation of the drive shaft 31 is transmitted to the propeller shaft 34 through the rearward moving gear 38. In other words, the forward/rearward moving switch section 35 is set to a rearward moving state in which rotation of the drive shaft 31 is transmitted to the propeller 33 so as to rotate the propeller 33 in a direction corresponding to rearward movement. Accordingly, the propeller 33 is rotated in the direction corresponding to the rearward movement of the vessel body 10. When the dog clutch 39 is located in the neutral position between the forward moving position and the rearward moving position, each of the forward moving gear 37 and the rearward moving gear 38 is rotatable relative to the propeller shaft 34. In other words, rotation of the drive shaft 31 is not transmitted to the propeller shaft 34 and the propeller shaft 34 is idle.

In the marine propulsion device 11, a driving force generated by the engine 24 is transmitted to the propeller 33 through the drive shaft 31 and the propeller shaft 34. Accordingly, the propeller 33 is rotated in either the direction corresponding to forward movement or the direction corresponding to rearward movement. As a result, a thrust is generated to move forward or rearward the watercraft 2 to which the marine propulsion device 11 is attached.

As shown in FIG. 2, the marine propulsion device 11 is provided with an exhaust pathway 40 in the interior thereof. The exhaust pathway 40 extends downward from the engine 24. The exhaust pathway 40 is connected to an exhaust port of the engine 24 and, as shown in FIG. 3, communicates with the internal space of a propeller boss 33*a* of the propeller 33. The exhaust gas from the engine 24 passes through the exhaust pathway 40 and is then discharged through the internal space of the propeller boss 33*a* into the water.

Figure 4:
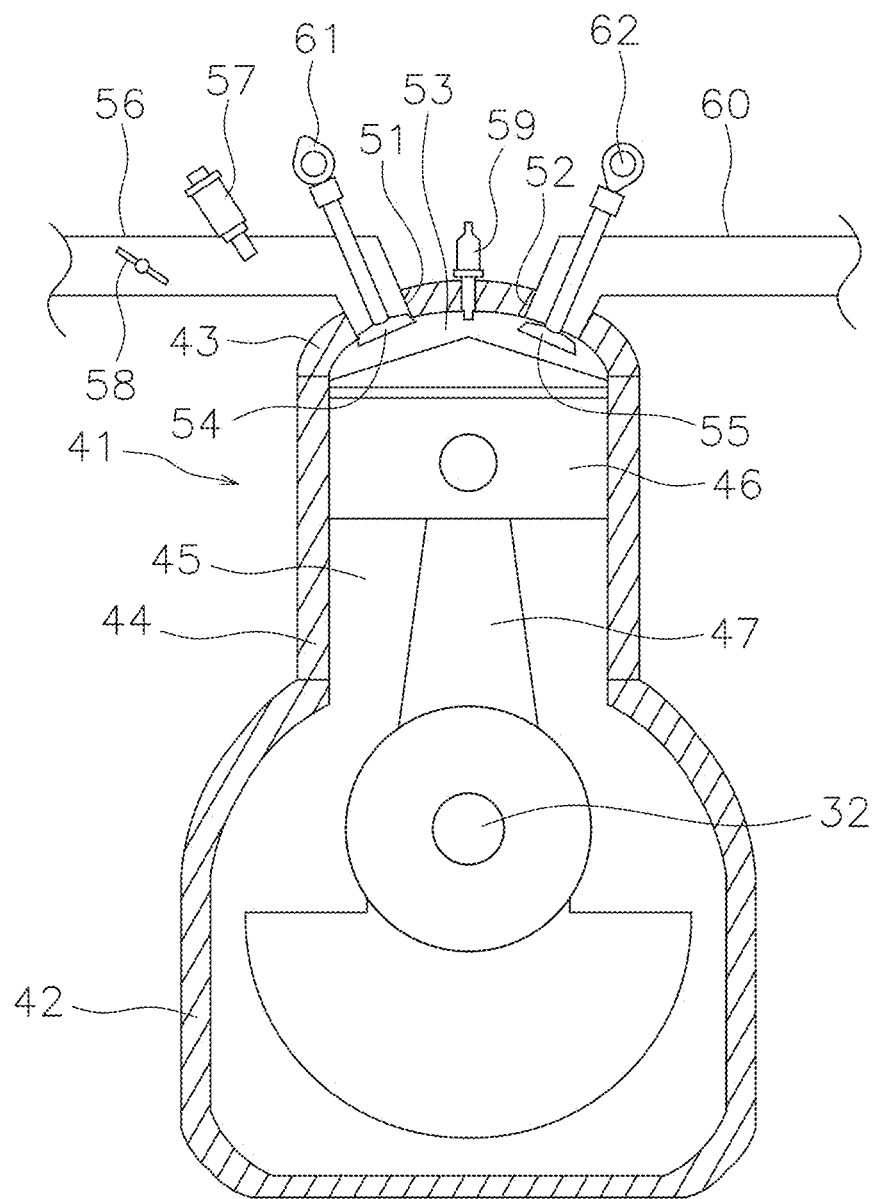
FIG. 4 is a diagram showing an internal configuration of an engine.

FIG. 4 is a schematic top view of an internal configuration of the engine 24. In the present preferred embodiment, the engine 24 includes a crankcase 42 and a plurality of cylinders 41, however, the number and the layout of the cylinders 41 may be set arbitrarily. The configuration of one cylinder 41 among the plurality of cylinders 41 of the engine 24 will be hereinafter explained based on FIG. 4, however, all of the plurality of cylinders 41 of the engine 24 have a similar configuration to the cylinder 41 shown in FIG. 4. The cylinder 41 includes a cylinder head 43 and a cylinder block 44. The cylinder head 43 is attached to the cylinder block 44. The cylinder block 44 is provided with a cylinder chamber 45 in the interior thereof. A piston 46 is disposed inside the cylinder chamber 45 while being movable in the axial direction of the cylinder chamber 45. A connecting rod 47 is coupled at one end thereof to the piston 46. The connecting rod 47 is coupled at the other end thereof to the crankshaft 32.

The cylinder head 43 includes an intake port 51, an exhaust port 52, and a combustion chamber 53. Each of the intake port 51 and the exhaust port 52 communicates with the combustion chamber 53. The intake port 51 is opened and closed by an intake valve 54. The exhaust port 52 is opened and closed by an exhaust valve 55. An intake pipe 56 is connected to the intake port 51. A fuel injection device 57 is attached to the intake pipe 56. The fuel injection device 57 injects a fuel to be supplied to the combustion chamber 53. A throttle valve 58 is disposed in the intake pipe 56. The amount of mixture gas to be fed to the combustion chamber 53 is regulated by changing the opening degree of the throttle valve 58. An exhaust pipe 60 is connected to the exhaust port 52. An ignition device 59 is attached to the cylinder head 43. The ignition device 59 is inserted into the combustion chamber 53 and ignites the fuel.

The intake valve 54 is biased in a direction corresponding to closing the intake port 51 by an urging member such as a coil spring or so forth (not shown in the drawings). The intake valve 54 is opened and closed when an intake camshaft 61 is driven to be rotated. The exhaust valve 55 is biased in a direction corresponding to closing the exhaust port 52 by an urging member such as a coil spring or so forth (not shown in the drawings). The exhaust valve 55 is opened and closed when an exhaust camshaft 62 is rotated.

Figure 5:
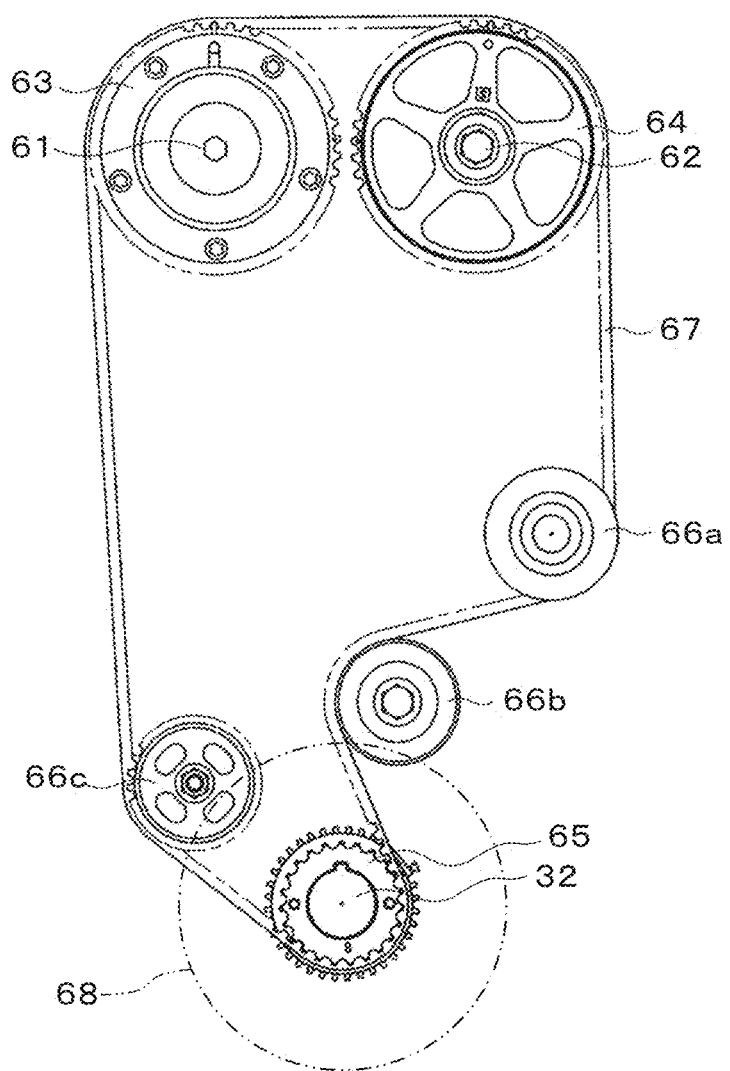
FIG. 5 is a diagram showing a configuration of a drive mechanism for camshafts.

FIG. 5 is a top view of a drive mechanism to rotate the intake camshaft 61 and the exhaust camshaft 62. The drive mechanism is disposed on, for instance, the top surface of the engine 24. As shown in FIG. 5, an intake cam pulley 63 is fixed to an end of the intake camshaft 61. An exhaust cam pulley 64 is fixed to an end of the exhaust camshaft 62. A crank pulley 65 is fixed to the crankshaft 32. Moreover, a cam belt 67 is wrapped and stretched over the intake cam pulley 63, the exhaust cam pulley 64, the crank pulley 65, and a plurality of intermediate pulleys 66*a*, 66*b*, and 66*c*. The driving force of the crankshaft 32 is transmitted to the intake camshaft 61 and the exhaust camshaft 62 through the cam belt 67. It should be noted that a flywheel 68 is fixed to an end of the crankshaft 32.

Figure 6:
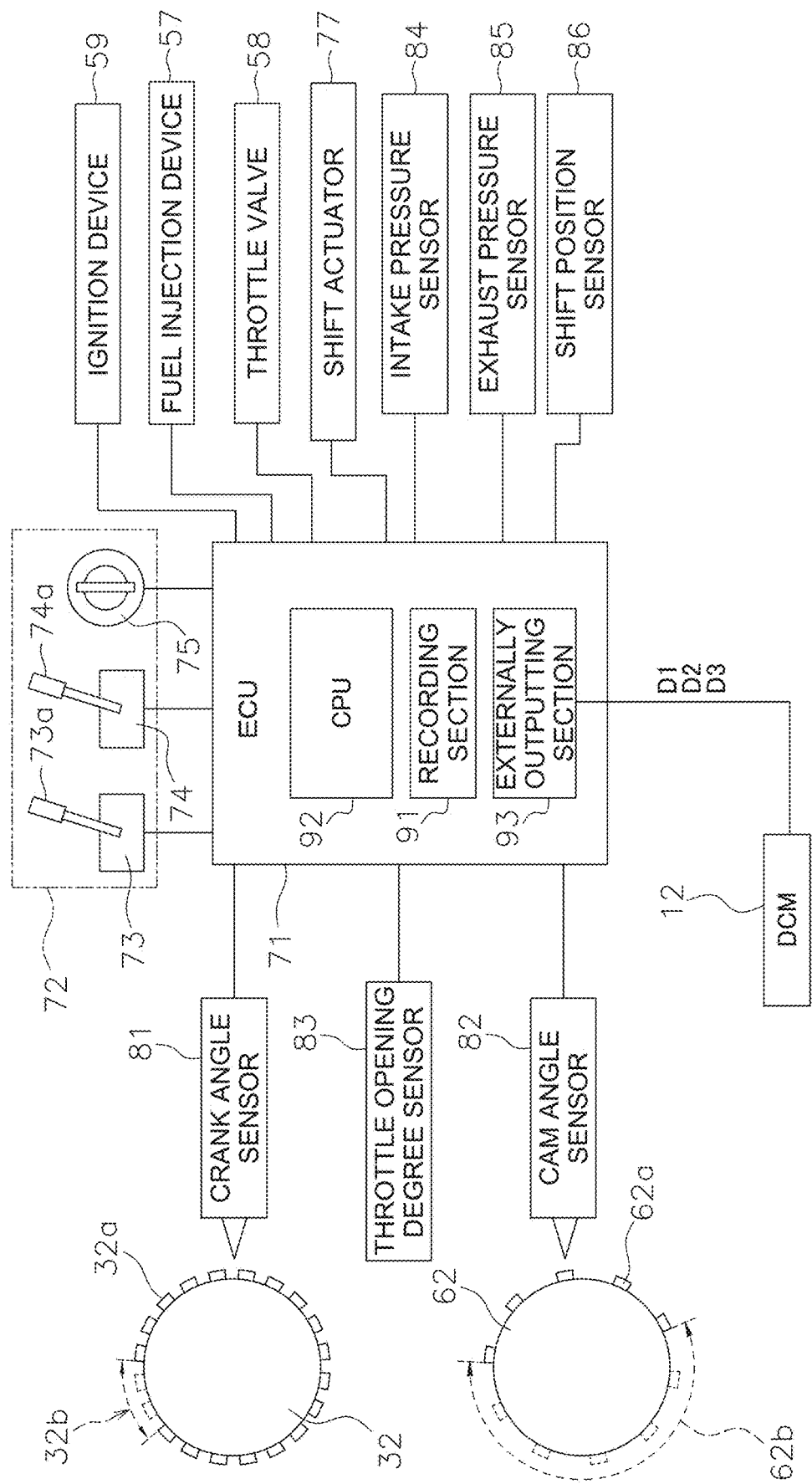
FIG. 6 is a schematic diagram showing a configuration of a control system of the engine.

FIG. 6 is a schematic diagram of a configuration of a control system of the engine 24. The engine 24 is controlled by an ECU (Engine Control Unit) 71. An operating device 72 and a variety of sensors 81 to 86 to detect a variety of information related to the engine 24 are connected to the ECU 71 (exemplary controller).

The operating device 72 includes a throttle operating device 73, a shift operating device 74, and a start/stop operating device 75 to start and stop of the engine 24. The throttle operating device 73 includes, for instance, a throttle operating member 73*a* such as a throttle lever. The throttle operating device 73 inputs an operating signal to control an output of the engine 24 to the ECU 71 in accordance with an operation of the throttle operating member 73*a*. The shift operating device 74 includes, for instance, a shift operating member 74*a* such as a shift lever. The shift operating device 74 inputs an operating signal to switch forward movement and rearward movement of the watercraft 2 to the ECU 71 in accordance with an operation of the shift operating member 74*a*. Specifically, the shift operating member 74*a* is operable to any one of shift positions composed of a forward moving position, a rearward moving position, and a neutral position. An operating signal, corresponding to one selected from the shift position, is inputted the ECU 71. The start/stop operating device 75 to start and stop of the engine 24 includes, for instance, a key switch and inputs an operating signal to start or stop the engine 24 to the ECU 71.

The sensors 81 to 86, connected to the ECU 71, include a crank angle sensor 81 (exemplary rotational speed sensor), a cam angle sensor 82, a throttle opening degree sensor 83, an intake pressure sensor 84, an exhaust pressure sensor 85, and a shift position sensor 86. The crank angle sensor 81 detects the angle of rotation of the crankshaft 32. The cam angle sensor 82 detects the angle of rotation of the exhaust camshaft 62. The throttle opening degree sensor 83 detects the opening degree of the throttle valve 58. The intake pressure sensor 84 detects the pressure inside the intake pipe 56. The exhaust pressure sensor 85 detects the pressure inside the exhaust pipe 60. The shift position sensor 86 detects which of the shift states the forward/rearward moving switch section 35 is set among the forward moving state, the rearward moving state, and the neutral state. The shift position sensor 86 detects the shift state of the forward/rearward moving switch section 35 by detecting, for instance, the position of the dog clutch 39 described above. Each of the sensors inputs a detection signal to the ECU 71.

The ECU 71 includes a recording section 91, a CPU (Central Processing Unit) 92, and an external outputting section 93. The recording section 91 is a recording device that electronic data are writable therein and readable therefrom. The recording section 91 includes a memory such as a RAM (Random Access Memory) or a ROM (Read Only Memory) and an auxiliary storage device such as an HDD (Hard Disk Drive) or an SSD (Solid State Drive). The recording section 91 stores control programs corresponding to predetermined operating states.

The recording section 91 records the detection signals outputted from the sensors 81 to 86. The recording section 91 records a serial number D1 of the engine 24 and an encryption key associated with the serial number D1 of the engine 24. The engine serial number and the encryption key associated therewith are written in the ECU 71 during manufacture of the engine 24. It should be noted that the information, with which the encryption key is associated, may not be limited to the engine serial number and is not particularly limited to specific information as long as the information is unique to the engine.

The recording section 91 records an operating time of the engine 24 (engine operating time D2) and information related to the engine 24 (engine related data D3). The engine operating time D2 is a cumulative operating time of the engine 24 since manufacture of the engine 24. The recording section 91 stores the cumulative engine operating time inputted thereto through the CPU 92 at predetermined intervals of time.

The engine related data D3 is a type of data for which falsification can be possibly made. The engine related data D3 includes the flow rate of fuel, information related to contact of an object against the propeller, or information related to reverse rotation.

The CPU 92, which includes a processor, determines the present operating state based on the signals inputted thereto from the variety of sensors 81 to 86 and the operating device 72. Under the control program corresponding to the present operating state, the CPU 92 controls actions of the ignition device 59, the fuel injection device 57, and the throttle valve 58. The ECU 71 controls the shift actuator 77 based on the operating signal inputted thereto from the shift operating device 74. The shift actuator 77 includes, for instance, a driver such as a motor. The shift actuator 77 is controlled by the ECU 71 to move the dog clutch 39 described above to any one of the forward moving position, the rearward moving position, and the neutral position.

The CPU 92 obtains the flow rate of fuel by cumulating the amount of fuel injected by the fuel injection device 57 and records the obtained flow rate of fuel in the recording section 91. Data related to the flow rate of used fuel are recorded in the recording section 91.

The CPU 92 determines whether or not the crankshaft 32 has been reversely rotated based on the detection signals recorded in the recording section 91, i.e., the detection signals inputted thereto from the crank angle sensor 81 and the cam angle sensor 82. Chances are that during reverse rotation of the crankshaft 32, water intrudes into the engine 24 through the exhaust pathway 40 shown in FIG. 2.

The reverse rotation of the crankshaft 32 is detected by, for instance, such a heretofore known method as disclosed in Japan Laid-open Patent Application Publication No. 2012-232681. Specifically, the reverse rotation of the crankshaft 32 is detected by the detection signals outputted from the crank angle sensor 81 and the cam angle sensor 82. In other words, the crank angle sensor 81 and the cam angle sensor 82 correspond to a reverse rotation detector to detect the reverse rotation of the crankshaft 32. A series of processes executed by the CPU 92 to detect the reverse rotation of the crankshaft 32 will be hereinafter explained.

The crank angle sensor 81 includes a magnetic sensor, and as shown in FIG. 6, detects passage of a plurality of protrusions 32a of the crankshaft 32. It should be noted that in FIG. 6, reference sign 32a is assigned to only a portion of the plurality of protrusions 32a. The crankshaft 32 is provided with the plurality of protrusions 32a regularly aligned on the surface thereof. It should be noted that the crankshaft 32 is provided with a missing region 32b on the surface thereof. The protrusions 32a are not provided in the missing region 32b and the interval between a pair of adjacent protrusions 32a defining the missing region 32b is different from that between each other pair of adjacent protrusions 32a.

The cam angle sensor 82 includes a magnetic sensor and detects passage of a plurality of protrusions 62a provided on the exhaust camshaft 62. It should be noted that in FIG. 6, reference sign 62a is assigned to only a portion of the plurality of protrusions 62a. The exhaust camshaft 62 is provided with the plurality of protrusions 62a regularly aligned on the surface thereof. It should be noted that the exhaust camshaft 62 is provided with a missing region 62b on the surface thereof. The protrusions 62a are not provided in the missing region 62b and the interval between a pair of adjacent protrusions 62a defining the missing region 62b is different from that between each other pair of adjacent protrusions 62a. When the engine 24 is started, the crankshaft 32, the intake camshaft 61, and the exhaust camshaft 62 are driven. Accordingly, the crank angle sensor 81 detects passage of the protrusions 32a of the crankshaft 32. On the other hand, the cam angle sensor 82 detects passage of the protrusions 62a of the exhaust camshaft 62. The crank angle sensor 81 and the cam angle sensor 82 transmit the detection signals to the ECU 71.

A magnetic field is strengthened when the protrusions 62a pass through a position opposed to the crank angle sensor 81, thus, periodic spikes are formed in the waveform of the detection signal. By contrast, when the missing region 62b passes through the position opposed to the crank angle sensor 81, such spikes are not formed in the waveform of the detection signal and the signal strength of the detection signal is kept constant. Because of this, crank spike regions, in each of which the periodic spikes are formed, and crank flat regions, in each of which the periodic spikes are not formed and the signal strength is kept constant (i.e., the waveform is flat), alternately appear in the waveform of the detection signal of the crank angle sensor 81. As a result of detecting these regions, the speed of rotation and the angle of rotation of the crankshaft 32 are detected. Likewise, cam spike regions, in each of which the periodic spikes continue due to passage of the protrusions 62a, and cam flat regions, in each of which a flat waveform continues due to passage of the missing region 62b, alternately appear in the waveform of the detection signal of the cam angle sensor 82. As a result of detecting these regions, the speed of rotation and the angle of rotation of the exhaust camshaft 62 are detected.

As described above, the crankshaft 32 and the exhaust camshaft 62 are rotated in conjunction with each other. Thus, when the crankshaft 32 is rotated forwardly (i.e., in a normal rotational direction), the crank spike regions and the cam spike regions appear in conjunction at identical timing.

In contrast, when the crankshaft 32 is rotated reversely (i.e., in a direction opposite to the normal rotational direction), the timing at which the cam spike regions are detected are different from that during forward rotation of the crankshaft 32. Because of this, the periods at which the crank spike regions and the cam spike regions are detected are different from those in the forward rotation of the crankshaft 32. When the crank spike regions and the cam spike regions are detected at periods different from those in the forward rotation of the crankshaft 32, the CPU 92 determines that reverse rotation of the crankshaft 32 has occurred.

When determining that reverse rotation of the crankshaft 32 has occurred, the CPU 92 records the information in the recording section 91 as information related to reverse rotation.

The CPU 92 determines whether or not the propeller 33 has been contacted (hit) by an object based on the detection signal of the crank angle sensor 81, which has been recorded in the recording section 91. The ECU 71 is able to determine the speed of rotation of the propeller 33 based on the detection signal of the crank angle sensor 81. Specifically, the speed of rotation of the propeller 33 is recorded at intervals of 10 ms, for instance, and the CPU 92 determines that the propeller 33 has been contacted by an object when the speed of rotation of the propeller 33 is reduced for 10 ms to an extent unlikely to occur during normal sudden deceleration. A threshold for determining the above can be arbitrarily set based on the horsepower of the marine propulsion device 11 or so forth. When determining that the propeller 33 has been contacted by an object, the CPU 92 records the result of the determination in the recording section 91 as information related to contact of an object against the propeller (information related to hitting of the propeller).

Alternatively, the CPU 92 may determine whether or not the propeller 33 has been contacted by an object based on the detection signal of the intake pressure sensor 84 and that of the crank angle sensor 81, both of which have been recorded in the recording section 91. The CPU 92 is able to determine a throttle state based on the detection signal of the intake pressure sensor 84. The ECU 71 is able to determine the speed of rotation of the propeller 33 based on the detection signal of the crank angle sensor 81. Thus, when it is specifically detected that the speed of rotation of the propeller 33 has reduced abruptly and then has increased while the throttle state has been kept constant, the CPU 92 determines that the propeller 33 has been contacted by an object. A threshold for determining the above can be arbitrarily set based on the horsepower of the marine propulsion device 11 or so forth. When determining that the propeller 33 has been contacted by an object, the CPU 92 records the result of determination in the recording section 91 as the information related to contact of an object against the propeller (information related to hitting of the propeller).

As described above, the flow rate of fuel, the information related to reverse rotation, or the information related to contact of an object against the propeller can be included in the engine related data D3.

The ECU 71 encrypts the engine operating time D2 and the engine related data D3 with the encryption key associated with the engine serial number D1. The ECU 71 outputs the serial number D1, the encrypted engine operating time D2, and the encrypted engine related data D3 to the DCM 12 through the external outputting section 93.

The external outputting section 93 includes an interface to perform electronic data communication with the DCM 12. The external outputting section 93 transmits the serial number D1, the encrypted engine operating time D2, and the encrypted engine related data D3 to the DCM 12.

The DCM 12 is disposed in the watercraft 2 and is connected to the ECU 71. As shown in FIG. 1, the DCM 12 includes a GPS (Global Positioning System) module 101, a recording section 102, a CPU (Central Processing Unit) 103, and a cellular module 104. The GPS module 101 receives a GPS signal from a GPS satellite and outputs positional information D4 of the watercraft 2 to the CPU 103. The recording section 102 includes a memory such as a RAM (Random Access Memory) or a ROM (Read Only Memory) and an auxiliary storage device such as an HDD (Hard Disk Drive) or an SSD (Solid State Drive). The recording section 102 stores control programs corresponding to predetermined operating states.

The CPU 103, which includes a processor, operates under the control programs stored in the recording section 102. The CPU 103 records the serial number D1, the encrypted engine operating time D2, and the encrypted engine related data D3, all of which are inputted thereto from the ECU 71, in the recording section 102.

The CPU 103 records the positional information D4, inputted thereto from the GPS module 101, in the recording section 102. The CPU 103 may record the positional information D4, inputted thereto from the GPS module 101, in the recording section 102, while associating the positional information D4 with the serial number D1, the encrypted engine operating time D2, and the encrypted engine related data D3, all of which have been received at a clock time that the positional information D4 has been received.

The CPU 103 transmits the serial number D1, the encrypted engine operating time D2, the encrypted engine related data D3, and the positional information D4, all of which have been recorded in the recording section 102, to the cloud server 3 through the cellular module 104 at predetermined intervals of time. Data are outputted from the ECU 71 to the DCM 12 every several minutes and are recorded in the recording section 102. Then, the data are transmitted from the DCM 12 to the cloud server 3 every several minutes or every several hours, for example. Likewise, the positional information D4 outputted from the GPS module 101 may be recorded in the recording section 102 every several minutes, for example.

Specifically, data may be outputted from the ECU 71 to the DCM 12 every one minute and may be recorded in the recording section 102. Then, data may be transmitted from the DCM 12 to the cloud server 3 every 10 minutes, for example. In the case described above, a plurality of data sets recorded in the recording section 102 are collectively transmitted to the cloud server 3. Likewise, regarding the positional information D4, a plurality of data sets may be recorded in the recording section 102. Then, the plurality of data sets of positional information D4 may be collectively transmitted from the DCM 12 to the cloud server 3.

It should be noted that a time stamp may be applied to each of the plurality of data sets to be transmitted to the cloud server 3. When the ECU 71 obtains either the engine operating time D2 or the engine related data D3, a time stamp may be applied to the obtained one D2, D3. The ECU 71 may encrypt the time stamp together with the engine operating time D2 and the engine related data D3. Clock time information, included in the data received by the GPS module 101, may be used as the time stamp for the positional information D4. Alternatively, the DCM 12 may apply a time stamp to the positional information D4.

The cellular module 104 is communicable with the cloud server 3 through a mobile communication network. The mobile communication network is, for instance, a network of a 3G, 4G, or 5G mobile communication system.

The cloud server 3 receives the serial number D1, the encrypted engine operating time D2, the encrypted engine related data D3, and the positional information D4 from the DCM 12. The cloud server 3 stores a plurality of engine serial numbers and a plurality of encryption keys associated with the engine serial numbers on a one-to-one basis as a plurality of pairs of engine serial number and encryption key. The cloud server 3 decrypts the encrypted engine operating time D2 and the encrypted engine related data D3 with the encryption key associated with the received serial number D1.

The cloud server 3 determines whether or not the decrypted engine related data D3 are genuine based on the decrypted engine operating time D2. The cloud server 3 determines whether or not the data D3 have been falsified.

Specifically, the cloud server 3 determines whether or not the engine related data D3 are genuine based on whether or not the engine operating time D2 has increased with elapse of time. For example, a time stamp has been applied to the engine operating time D2, the cloud server 3 is able to determine that the engine related data D3 are not genuine, for instance, when the engine operating time D2 at a predetermined clock time is less than that at a clock time earlier than the predetermined clock time. Alternatively, the cloud server 3 is able to determine that the engine related data D3 are not genuine, for instance, when the engine operating time D2 received presently by the cloud server 3 is less than that received previously by the cloud server 3. When the cloud server 3 collectively receives a plurality of data sets of the engine operating time D2, for instance, comparison can be made between one of the plurality of data sets of the engine operating time D2 received presently by the cloud server 3 and another of those received previously by the cloud server 3. With this configuration, it is possible to prevent a type of falsification that data outputted from the ECU 71 have been recorded in advance and thereafter the recorded data are outputted to the DCM 12.

Incidentally, when the engine related data D3 include the flow rate of fuel, the cloud server 3 is able to determine whether or not the engine related data D3 are genuine based on whether or not the operating time has increased in accordance with the amount of used fuel. For example, when a difference between a presently received operating time and a previously received operating time is large in comparison with the amount of used fuel calculated from a difference between a presently received flow rate of fuel and a previously received flow rate of fuel, it is possible to determine that the operating time is long with respect to the amount of used fuel. Thus, the cloud server 3 is able to determine that the engine related data D3 are not genuine. With this configuration, it is possible to prevent a type of falsification in which data outputted from the ECU 71 have been recorded during traveling at a low speed with a less amount of used fuel and thereafter the recorded data are outputted to the DCM 12.

The cloud server 3 is able to determine that a misconduct has been done in the following situation: the cloud server 3 has received the positional information D4 but has not yet received the encrypted engine operating time D2 and the encrypted engine related data D3 even though the positional information has been changed. For example, the misconduct can be exemplified by cutting/disconnecting of a wiring that connects the DCM 12 and the ECU 71. When cutting/disconnecting of the wiring between the DCM 12 and ECU 71 is the misconduct, the positional information D4 detected by the DCM 12 becomes the only data to be transmitted to the cloud server 3. Thus, the misconduct is detected based on this reasoning.

The cloud server 3 may receive unencrypted engine related data D3 together with the serial number D1, the encrypted engine operating time D2, and the encrypted engine related data D3 from the DCM 12. In this case, the cloud server 3 may compare the unencrypted engine related data D3 and the decrypted engine related data D3 and may determine that the engine related data D3 are genuine when the unencrypted engine related data D3 and the decrypted engine related data D3 are matched. With this configuration, it is possible to confirm whether or not data decryption has been performed correctly. Even when data decryption succeeds albeit a false encryption key is used for the data decryption, the following can be prevented: whether or not data are genuine is erroneously determined based on the data decrypted with the false encryption key. It should be noted that when the unencrypted engine related data D3 are transmitted to the cloud server 3, the ECU 71 transmits the unencrypted engine related data D3 to the DCM 12. Then, the DCM 12 records the unencrypted engine related data D3 in the recording section 102.

Figure 7:
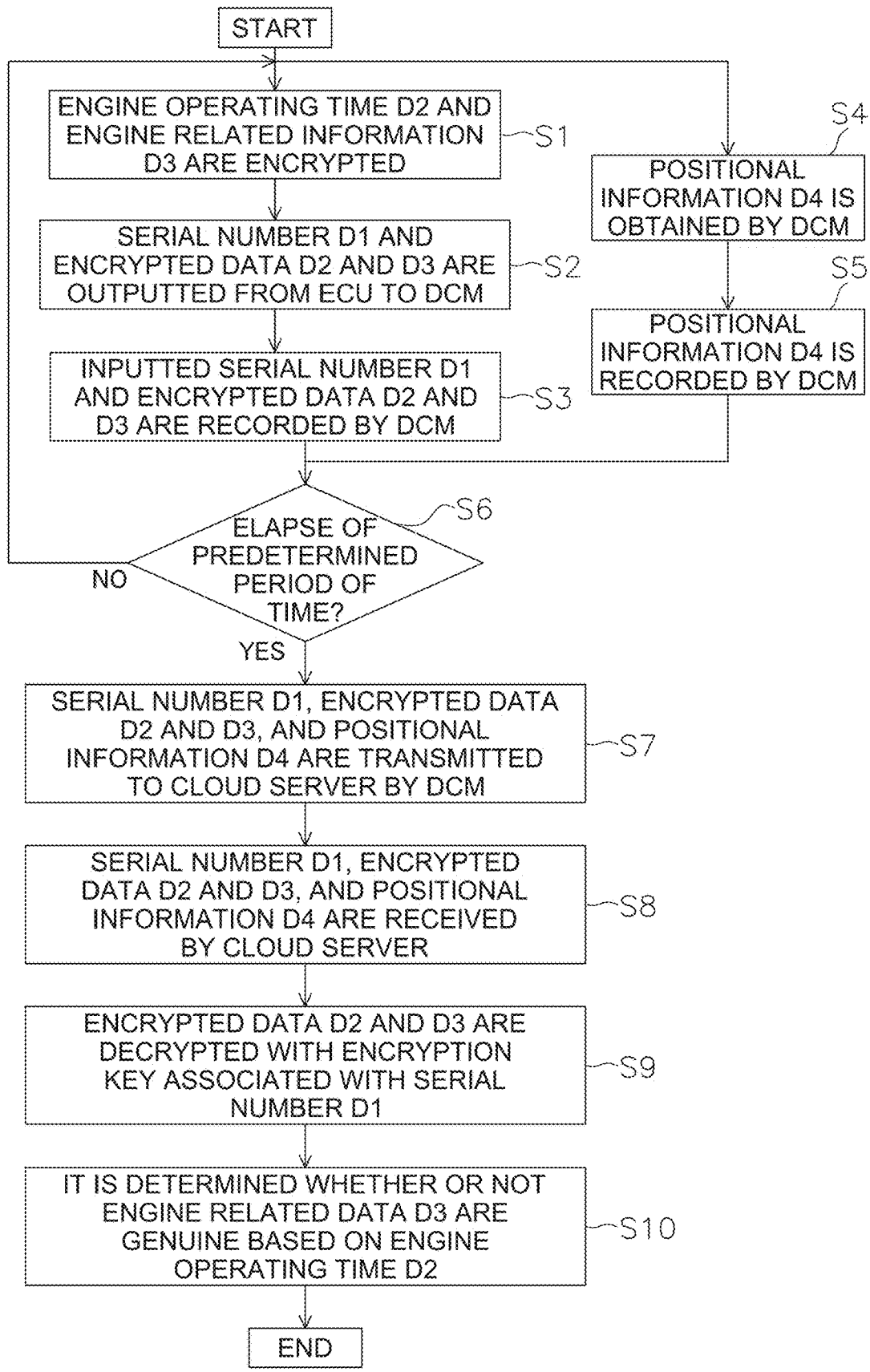
FIG. 7 is a flowchart showing a marine propulsion device information transmitting and receiving method according to a preferred embodiment of the present invention.

Next, a marine propulsion device information transmitting and receiving method according to a preferred embodiment of the present invention will be explained. FIG. 7 is a flowchart showing a marine propulsion device information transmitting and receiving method according to the present preferred embodiment.

In step S1, the CPU 92 in the ECU 71 encrypts the engine operating time D2 and the engine related data D3 with the encryption key associated with the serial number of the engine 24. The encryption key has been recorded in the recording section 91 in advance.

In step S2, the serial number D1, the encrypted engine operating time D2, and encrypted engine related data D3 are outputted from the ECU 71 to the DCM 12.

In step S3, the serial number D1, the encrypted engine operating time D2, and the encrypted engine related data D3 are inputted to the DCM 12. Then, the DCM 12 records the data D1, D2, and D3 in the recording section 102.

In parallel with steps S1 to S3 described above, the GPS module 101 in the DCM 12 receives the positional information D4 from the GPS satellite in step S4. Then, in step S5, the positional information D4 is recorded in the recording section 102 in the DCM 12.

In step S6, the DCM 12 determines whether or not a predetermined period of time has elapsed. The control flow in steps S1 to S3 and that in steps S4 and S5 are repeated respectively until the predetermined period of time elapses. With the repetition of steps S1 to S3, a triad of data, composed of the serial number D1, the encrypted engine operating time D2, and the encrypted engine related data D3, is recorded in the recording section 102 in the DCM 12 a plurality of times in a time-series manner as a plurality of triads of data sets. With the repetition of steps S4 and S5, the positional information D4 is recorded in the recording section 102 in the DCM 12 a plurality of times in a time-series manner as a plurality of data sets. The encrypted engine operating time D2 and the encrypted engine related data D3 may be obtained at intervals of time equal to or different from those at which the positional information D4 is obtained. When a clock time, at which the encrypted engine operating time D2 and the encrypted engine related data D3 have been obtained, and a clock time, at which the positional information D4 has been obtained, fall in a predetermined range of clock time, the CPU 103 may record the encrypted engine operating time D2, the encrypted engine related data D3, and the positional information D4 in the recording section 102, while both the encrypted engine operating time D2 and the encrypted engine related data D3 are associated with the positional information D4.

In step S7, the DCM 12 transmits the serial number D1, the encrypted engine operating time D2, the encrypted engine related data D3, and the positional information D4 to the cloud server 3.

In step S8, the cloud server 3 receives the serial number D1, the encrypted engine operating time D2, the encrypted engine related data D3, and the positional information D4.

In step S9, the cloud server 3 decrypts the encrypted engine operating time D2 and the encrypted engine related data D3 with the encryption key associated with the serial number D1.

In step S10, the cloud server 3 determines whether or not the decrypted engine related data D3 are genuine based on the decrypted engine operating time D2. Then, the control steps end.

It should be noted that, when determining that the engine related data D3 are not genuine, the cloud server 3 may record the watercraft 2 relevant to the engine related data D3 and may specify a user who has used the watercraft 2. Besides or alternatively, when determining that the engine related data D3 are not genuine, the cloud server 3 may transmit a warning signal to the DCM 12 so as to display a warning on a monitor or so forth installed in the watercraft 2.

The marine propulsion device information transmitting and receiving system 1 according to a preferred embodiment of the present invention may include the following features.

The engine related data D3 are encrypted with the encryption key and are then transmitted to the cloud server 3 such that false data are prevented from being inputted into the DCM 12 and then transmitted to the server. The engine operating time D2 is transmitted together with the engine related data D3. Thus, it is possible to determine whether or not the engine related data D3 are genuine based on the operating time. Because of this, even when the engine is operated in an arbitrary operating state, data outputted from the engine at this point of time are stored for a predetermined period of time, are then transmitted to a communication device, and are further transmitted therefrom as false data to the server, it is possible to determine that the data received by the server correspond to the stored data with reference to the operating time. With this configuration, it is possible to prevent the engine related data from being falsified.

The ECU 71 obtains the flow rate of fuel to be supplied to the engine 24. The engine related data D3 include the flow rate of fuel. With this configuration, it is possible to determine whether or not data of the flow rate of fuel transmitted to the cloud server 3 are genuine.

The cloud server 3 determines whether or not the engine related data D3 are genuine based on an increase in the engine operating time D2. For example, in boat rental or so forth, when the engine operating time D2 is too short in comparison with a rental time, the occurrence of problems or data falsification can be suspected.

When the engine operating time D2 at a predetermined time is less than that at an earlier time than the predetermined time, the cloud server 3 determines that the engine related data D3 are not genuine. The engine operating time is defined as a cumulative operating time counted since manufacture of the engine. Thus, when the operating time becomes lower, it is possible to determine that the following type of data falsification has been made: the data, outputted from the ECU 71 have been recorded previously and are thereafter inputted into the DCM 12.

The cloud server 3 determines whether or not the engine related data D3 are genuine based on whether or not the engine operating time D2 has increased with an increase in an amount of used fuel detected based on the flow rate of fuel. With this configuration, it is possible to determine that the engine related data D3 are not genuine when the operating time has not appropriately increased with the increase in the amount of used fuel.

The DCM 12 transmits not only the serial number D1, the encrypted engine operating time D2, and the encrypted engine related data D3, but also the unencrypted engine related data to the cloud server 3. The cloud server 3 compares the decrypted engine related data D3 and the unencrypted engine related data. Then, when the compared data are matched, the cloud server 3 determines that the engine related data D3 are genuine. With this configuration, it is possible to confirm whether or not data decryption has been performed correctly. Even when data decryption succeeds albeit a false encryption key is used for the data decryption, it is possible to prevent that whether or not data are genuine is erroneously determined based on the data decrypted with the false encryption key.

The marine propulsion device 11 further includes the propeller 33, the crankshaft 32, and the crank angle sensor 81 (exemplary rotation speed sensor). The crankshaft 32 is rotated by the engine 24 and transmits the driving force of the engine 24 to the propeller 33. The ECU 71 determines whether or not the propeller 33 has been contacted by an object based on the detection signal transmitted thereto from the crank angle sensor 81. The engine related data D3 include information related to contact of an object against the propeller 33. Thus, the ECU 71 encrypts the information that the propeller 33 has been contacted by an object and transmits the encrypted information to the cloud server 3. Then, the cloud server 3 determines whether or not the engine related data D3 are genuine based on the engine operating time D2. Because of this, it is possible to prevent a type of falsification of deleting a record that the propeller 33 has been contacted by an object.

The marine propulsion device 11 further includes the propeller 33, the crankshaft 32, the crank angle sensor 81 (exemplary rotation speed sensor), and the intake pressure sensor 84. The crankshaft 32 is rotated by the engine 24 and transmits the driving force of the engine 24 to the propeller 33. The ECU 71 determines whether or not the propeller 33 has been contacted by an object based on the detection signals transmitted thereto from the intake pressure sensor 84 and the crank angle sensor 81. The engine related data D3 include information related to contact of an object against the propeller 33. Thus, the ECU 71 encrypts the information that the propeller 33 has been contacted by an object and transmits the encrypted information to the cloud server 3. Then, the cloud server 3 determines whether or not the engine related data D3 are genuine based on the engine operating time D2. Because of this, it is possible to prevent the type of falsification of deleting a record that the propeller 33 has been contacted by an object.

The marine propulsion device 11 further includes the propeller 33, the crankshaft 32, the crank angle sensor 81, and the cam angle sensor 82 (exemplary reverse rotation detector). The crankshaft 32 is rotated by the engine 24 and transmits the driving force of the engine 24 to the propeller 33. The crank angle sensor 81 and the cam angle sensor 82 detect information related to reverse rotation of the crankshaft 32. The ECU 71 determines whether or not the crankshaft 32 has been reversely rotated based on the information detected by the crank angle sensor 81 and the cam angle sensor 82. The engine related data D3 include information related to reverse rotation of the crankshaft 32. Thus, the ECU 71 encrypts the information that the crankshaft 32 has been reversely rotated and transmits the encrypted information to the cloud server 3. Then, the cloud server 3 determines whether or not the engine related data D3 are genuine based on the engine operating time D2. Because of this, it is possible to prevent a type of falsification of deleting a record that the crankshaft 32 has been reversely rotated.

The DCM 12 includes the GPS module 101 (exemplary position detector) to detect the position of the watercraft 2. The DCM 12 transmits the positional information (exemplary detected positional data) detected by the GPS module 101 to the cloud server 3. The cloud server 3 determines that a misconduct has been done when movement of the watercraft 2 has been detected based on the GPS module 101, while the serial number D1, the encrypted engine operating time D2, and the encrypted engine related data D3 have not been received by the cloud server 3. The misconduct may be exemplified by, for instance, cutting/disconnecting of a wire that connects the DCM 12 and the ECU 71. The reason for providing this example is that, when cutting/disconnecting of the wiring between the DCM 12 and ECU 71 is done, the positional information D4 detected by the DCM 12 becomes the only data to be transmitted to the cloud server 3.

Preferred embodiments of the present invention have been explained above. However, the present invention is not limited to the preferred embodiments described above, and a variety of changes can be made without departing from the gist of the present invention.

In a preferred embodiment described above, whether or not the crankshaft 32 has been reversely rotated is determined by the ECU 71. However, this may not be necessarily determined by the ECU 71 and may be determined by the cloud server 3. In this case, the ECU 71 encrypts the detection signals transmitted thereto from the crank angle sensor 81 and the cam angle sensor 82. The encrypted detection signals are included in the encrypted engine related data D3. The DCM 12 transmits the serial number D1, the encrypted engine operating time D2, and the encrypted engine related data D3 to the cloud server 3. The cloud server 3 determines whether or not the crankshaft 32 has been reversely rotated based on the decrypted detection signals of the crank angle sensor 81 and the cam angle sensor 82.

In a preferred embodiment described above, whether or not the propeller 33 has been contacted by an object is determined by the ECU 71. However, this may not be necessarily detected by the ECU 71 and may be determined by the cloud server 3. In this case, the ECU 71 encrypts the detection signals of the crank angle sensor 81 and the intake pressure sensor 84. The encrypted detection signals are included in the encrypted engine related data D3. The DCM 12 transmits the serial number D1, the encrypted engine operating time D2, and the encrypted engine related data D3 to the cloud server 3. The cloud server 3 determines whether or not the propeller 33 has been contacted by an object based on the decrypted detection signals of the crank angle sensor 81 and the intake pressure sensor 84.

In a preferred embodiment described above, the DCM 12 is provided with the GPS module 101 but may not be provided with the GPS module 101. In this case, the DCM 12 transmits the engine serial number D1, the encrypted engine operating time D2, and the encrypted engine related data D3 to the cloud server 3.

In a preferred embodiment described above, the ECU 71 is configured or programmed to obtain the flow rate of fuel by cumulating the amount of fuel injected by the fuel injection device 57. However, the flow rate of fuel may not be necessarily obtained as described above. For example, a fuel flow rate sensor may be provided as a discrete component. Then, the flow rate of fuel may be obtained by obtaining a detection signal outputted from the fuel flow rate sensor.

In a preferred embodiment described above, the marine propulsion device information transmitting and receiving system 1 includes the cloud server 3. However, the marine propulsion device information transmitting and receiving system 1 may not necessarily include the cloud server 3 but may include a physical server.

According to preferred embodiments of the present invention, it is possible to provide marine propulsion device information transmitting and receiving systems and marine propulsion device information transmitting and receiving methods such that data related to an engine of a watercraft is prevented from being falsified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion device information transmitting and receiving system comprising:
   a server; and
   a watercraft including a propulsion device and a communicator to communicate with the server; wherein
   the propulsion device includes an engine and a controller configured or programmed to control the engine, the controller being connected to the communicator;
   the controller is configured or programmed to encrypt an operating time of the engine and data related to the engine with an encryption key associated with information unique to the engine;
   the communicator is configured or programmed to transmit the information unique to the engine, the encrypted operating time of the engine, and the encrypted data related to the engine to the server; and
   the server is configured or programmed to receive the information unique to the engine, the encrypted operating time of the engine, and the encrypted data related to the engine, to decrypt the encrypted operating time of the engine and the encrypted data related to the engine with the encryption key associated with the information unique to the engine, and to determine whether or not the decrypted data related to the engine are genuine based on the decrypted operating time of the engine.

2. The marine propulsion device information transmitting and receiving system according to claim 1, wherein
   the controller is configured or programmed to obtain a flow rate of a fuel to be supplied to the engine; and
   the data related to the engine include the flow rate of the fuel.

3. The marine propulsion device information transmitting and receiving system according to claim 2, wherein the server is configured or programmed to determine whether or not the decrypted data related to the engine are genuine based on whether or not the operating time of the engine has increased with an increase in a used amount of the fuel detected based on the flow rate of the fuel.

4. The marine propulsion device information transmitting and receiving system according to claim 1, wherein the server is configured or programmed to determine whether or not the decrypted data related to the engine are genuine based on whether or not the operating time of the engine has increased.

5. The marine propulsion device information transmitting and receiving system according to claim 1, wherein the server is configured or programmed to determine that the decrypted data related to the engine are not genuine when the operating time of the engine is lower at a predetermined time than at an earlier time than the predetermined time.

6. The marine propulsion device information transmitting and receiving system according to claim 1, wherein
the communicator is configured or programmed to transmit to the server not only the information unique to the engine, the encrypted operating time of the engine, and the encrypted data related to the engine, but also the data related to the engine having not yet been encrypted; and
the server is configured or programmed to determine that the decrypted data related to the engine are genuine when the decrypted data related to the engine are matched with the data related to the engine having not yet been encrypted as a result of a comparison therebetween.

7. The marine propulsion device information transmitting and receiving system according to claim 1, wherein the information unique to the engine is a serial number assigned to the engine.

8. The marine propulsion device information transmitting and receiving system according to claim 1, wherein
the propulsion device further includes a propeller, a crankshaft rotated by the engine to transmit a driving force of the engine to the propeller, and a rotational speed sensor to detect a rotational speed of the crankshaft;
the controller is configured or programmed to determine whether or not the propeller has been contacted by an object based on a value detected by the rotational speed sensor; and
the data related to the engine include information related to the object contacting the propeller.

9. The marine propulsion device information transmitting and receiving system according to claim 1, wherein
the propulsion device further includes a propeller, a crankshaft rotated by the engine to transmit a driving force of the engine to the propeller, a rotational speed sensor to detect a rotational speed of the crankshaft, and an intake pressure sensor to detect an intake pressure of the engine;
the controller is configured or programmed to determine whether or not the propeller has been contacted by an object based on a value detected by the rotational speed sensor and a value detected by the intake pressure sensor; and
the data related to the engine include information related to the object contacting the propeller.

10. The marine propulsion device information transmitting and receiving system according to claim 1, wherein
the propulsion device further includes a propeller, a crankshaft rotated by the engine to transmit a driving force of the engine to the propeller, and a reverse rotation detector to detect information related to a reverse rotation of the crankshaft;
the controller is configured or programmed to determine whether or not the crankshaft has been reversely rotated based on the information detected by the reverse rotation detector; and
the data related to the engine include the information related to reverse rotation of the crankshaft.

11. The marine propulsion device information transmitting and receiving system according to claim 1, wherein
the communicator includes a position detector to detect a position of the watercraft;
the communicator is operable to transmit data related to the position detected by the position detector to the server; and
the server is configured or programmed to detect a misconduct when movement of the watercraft has been detected based on the data related to the position detected by the position detector while the information unique to the engine, the encrypted operating time of the engine, and the encrypted data related to the engine have not yet been received by the server.

12. A marine propulsion device information transmitting and receiving method of transmitting and receiving data related to an engine of a propulsion device installed in a watercraft, the marine propulsion device information transmitting and receiving method comprising:
encrypting the data related to the engine of the propulsion device and an operating time of the engine with an encryption key associated with information unique to the engine;
transmitting the information unique to the engine, the encrypted data related to the engine, and the encrypted operating time of the engine to a server through a communicator;
receiving the information unique to the engine, the encrypted data related to the engine, and the encrypted operating time of the engine by the server; and
decrypting the encrypted data related to the engine and the encrypted operating time of the engine with the encryption key associated with the information unique to the engine and determining whether or not the decrypted data related to the engine are genuine based on the decrypted operating time of the engine.

13. A marine propulsion device information transmitting and receiving system comprising:
a server; and
a watercraft including a propulsion device and a communicator configured or programmed to perform communication with the server; wherein
the propulsion device includes an engine and a controller configured or programmed to control the engine, the controller being connected to the communicator;
the controller is configured or programmed to encrypt an operating time of the engine and data related to the engine with an encryption key;
the communicator is configured or programmed to transmit the encrypted operating time of the engine and the encrypted data related to the engine to the server; and
the server is configured or programmed to decrypt the encrypted operating time of the engine and the encrypted data related to the engine with an encryption key, and to determine whether or not the decrypted data related to the engine are genuine based on the decrypted operating time of the engine.

* * * * *